(12) United States Patent
Shin et al.

(10) Patent No.: US 8,269,429 B2
(45) Date of Patent: Sep. 18, 2012

(54) APPARATUS FOR DRIVING LIGHT EMITTING DEVICE

(75) Inventors: Sang Cheol Shin, Gyunggi-Do (KR); Byoung Own Min, Gyunggi-Do (KR); Jung Chul Gong, Seoul (KR); Bon Ahm Goo, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 263 days.

(21) Appl. No.: 12/578,823

(22) Filed: Oct. 14, 2009

(65) Prior Publication Data

US 2010/0102756 A1    Apr. 29, 2010

(30) Foreign Application Priority Data

Oct. 28, 2008    (KR) ........................ 10-2008-0106187

(51) Int. Cl.
| | | |
|---|---|---|
| *H05B 37/02* | (2006.01) | |
| *H05B 39/04* | (2006.01) | |
| *H05B 41/36* | (2006.01) | |
| H05B 37/00 | (2006.01) | |
| H05B 39/00 | (2006.01) | |
| H05B 41/00 | (2006.01) | |

(52) U.S. Cl. .......................... 315/297; 315/210; 315/312
(58) Field of Classification Search ........................ None
See application file for complete search history.

(56) References Cited

U.S. PATENT DOCUMENTS

| 6,864,641 | B2 | 3/2005 | Dygert | |
|---|---|---|---|---|
| 2007/0296353 | A1 | 12/2007 | Ito et al. | |
| 2008/0297067 | A1* | 12/2008 | Wang et al. | 315/294 |
| 2009/0134817 | A1* | 5/2009 | Jurngwirth et al. | 315/307 |

FOREIGN PATENT DOCUMENTS

| CN | 101057344 | 10/2007 |
|---|---|---|
| KR | 1020070015857 A | 2/2007 |
| KR | 1020080087819 A | 10/2008 |

OTHER PUBLICATIONS

Korean Office Action for application No. 10-2008-0106187, issued Apr. 5, 2010.
Chinese Office Action for Application No. 200910207525.1 dated May 4, 2012.

\* cited by examiner

*Primary Examiner* — Douglas W Owens
*Assistant Examiner* — Dedei K Hammond
(74) *Attorney, Agent, or Firm* — Lowe, Hauptman, Ham & Berner, LLP

(57) ABSTRACT

An apparatus for driving a light emitting device according to an aspect of the invention may include: a DC/DC converter unit generating driving power on the basis of an input voltage and supplying the generated driving power to an anode of a light emitting unit including a plurality of light emitting devices; a current source controlling to keep current flowing through the light emitting unit constant; a feedback circuit unit detecting voltage at a cathode of the light emitting unit; and a feedback coupling circuit unit coupling the output of the feedback circuit unit and the input of the DC/DC converter unit to supply the input voltage of the DC/DC converter unit according to the voltage detected by the feedback circuit unit and an output voltage of the DC/DC converter unit.

10 Claims, 3 Drawing Sheets

APPARATUS FOR DRIVING LIGHT EMITTING DEVICE

CROSS-REFERENCE TO RELATED APPLICATIONS

This application claims the priority of Korean Patent Application No. 10-2008-0106187 filed on Oct. 28, 2008, in the Korean Intellectual Property Office, the disclosure of which is incorporated herein by reference.

BACKGROUND OF THE INVENTION

1. Field of the Invention

The present invention relates to apparatuses for driving light emitting devices, and more particularly, to an apparatus for driving a light emitting device that couples a feedback circuit and a DC/DC converter to each other to optimize DC/DC conversion and increase the driving efficiency of the DC/DC converter.

2. Description of the Related Art

In general, light emitting diodes (LEDs) have been applied to various objects in many fields, such as lighting apparatuses and backlight units, and will also be applied to more various fields in the future. Methods of driving LEDs include a method using switch-mode DC/DC converters and a method using linear current sources.

In the related art, an apparatus for driving LEDs using a current source includes a DC/DC converter that supplies driving power to LEDs and a current source that controls the currents flowing through the LEDs being driven by the driving power.

However, in the apparatus for driving LEDs according to the related art, LEDs may be open. When a detection circuit detecting whether LEDs are open is added, a control unit needs to be added to control the driving operation according to a detection signal supplied by the detection circuit. Furthermore, the configuration of the driving apparatus becomes complicated, that is, additional software or hardware configuration needs to be implemented such that the control unit performs a control operation according to a detection signal. This causes an increase in manufacturing costs, thereby reducing the competitiveness of the final product.

SUMMARY OF THE INVENTION

An aspect of the present invention provides an apparatus for driving a light emitting device that couples a feedback circuit and a DC/DC converter to each other to optimize DC/DC conversion and increase the driving efficiency of the DC/DC converter.

According to an aspect of the present invention, there is provided an apparatus for driving a light emitting device, the apparatus including: a DC/DC converter unit generating driving power on the basis of an input voltage and supplying the generated driving power to an anode of a light emitting unit including a plurality of light emitting devices; a current source controlling to keep current flowing through the light emitting unit constant; a feedback circuit unit detecting voltage at a cathode of the light emitting unit; and a feedback coupling circuit unit coupling the output of the feedback circuit unit and the input of the DC/DC converter unit to supply the input voltage of the DC/DC converter unit according to the voltage detected by the feedback circuit unit and an output voltage of the DC/DC converter unit.

The light emitting unit may include light emitting diodes (LEDs) as the plurality of light emitting devices.

The feedback coupling circuit unit may include: a first resistor connected between an output terminal of the DC/DC converter unit and an input node of the DC/DC converter unit; a second resistor connected between the input node and a ground; and a third resistor connected between an output terminal of the feedback circuit unit and the input node.

The current source may include: a first transistor having a collector connected to the cathode of the light emitting unit, an emitter connected to a ground through an emitter resistor and a base; and a first comparator having a non-inverting input terminal connected to the emitter of the first transistor, an inverting input terminal receiving an analog dimming voltage, and an output terminal connected to the base of the first transistor, the first comparator comparing the analog dimming voltage and voltage across the emitter resistor and supplying voltage according to the comparison result to the base of the first transistor.

The feedback circuit unit may include: a V/I amplifier outputting an error current corresponding to a difference voltage between a detection voltage at the cathode of the light emitting unit and a predetermined reference voltage; and a capacitor storing charges according to the error current from the V/I amplifier to supply an error voltage to the feedback coupling circuit unit.

The reference voltage may be obtained by adding the analog dimming voltage and voltage passed between the collector and the emitter of the first transistor.

The feedback coupling circuit unit may include: a buffer amplifier buffering the error voltage from the feedback circuit unit; a first resistor connected between the output terminal of the DC/DC converter unit and the input node of the DC/DC converter unit; a second resistor connected between the input node and the ground; and a third resistor connected between an output terminal of the buffer amplifier and the input node.

The current source may include: a first transistor having a collector connected to the cathode of the light emitting unit, an emitter connected to a ground through an emitter resistor and a base; and a first comparator having an inverting input terminal connected to the emitter of the first transistor, a non-inverting input terminal receiving an analog dimming voltage, and an output terminal connected to the base of the first transistor, the first comparator comparing the analog dimming voltage and voltage across the emitter resistor to supply voltage according to the comparison result to the base of the first transistor.

The feedback circuit unit may include: a V/I amplifier outputting an error current corresponding to a difference voltage between a detection voltage at the cathode of the light emitting unit and a predetermined reference voltage; and a capacitor storing charges according to the error current from the V/I amplifier and supplying an error voltage to the feedback coupling circuit unit.

The reference voltage may be obtained by adding the analog dimming voltage and voltage between the collector and the emitter of the first transistor.

The buffer amplifier may include a first operational amplifier having a non-inverting input terminal, an inverting input terminal and an output terminal, and the non-inverting input terminal of the first operational amplifier is connected to an output terminal of the feedback circuit unit, and the inverting input terminal of the first operational amplifier is connected to the output terminal of the first operational amplifier.

The buffer amplifier may include a second transistor having a collector, an emitter and a base, and the collector of the second transistor is connected to an operating power supply terminal, the emitter of the second transistor is connected to a ground through a fourth resistor, and the base of the second transistor is connected to the output terminal of the feedback circuit unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
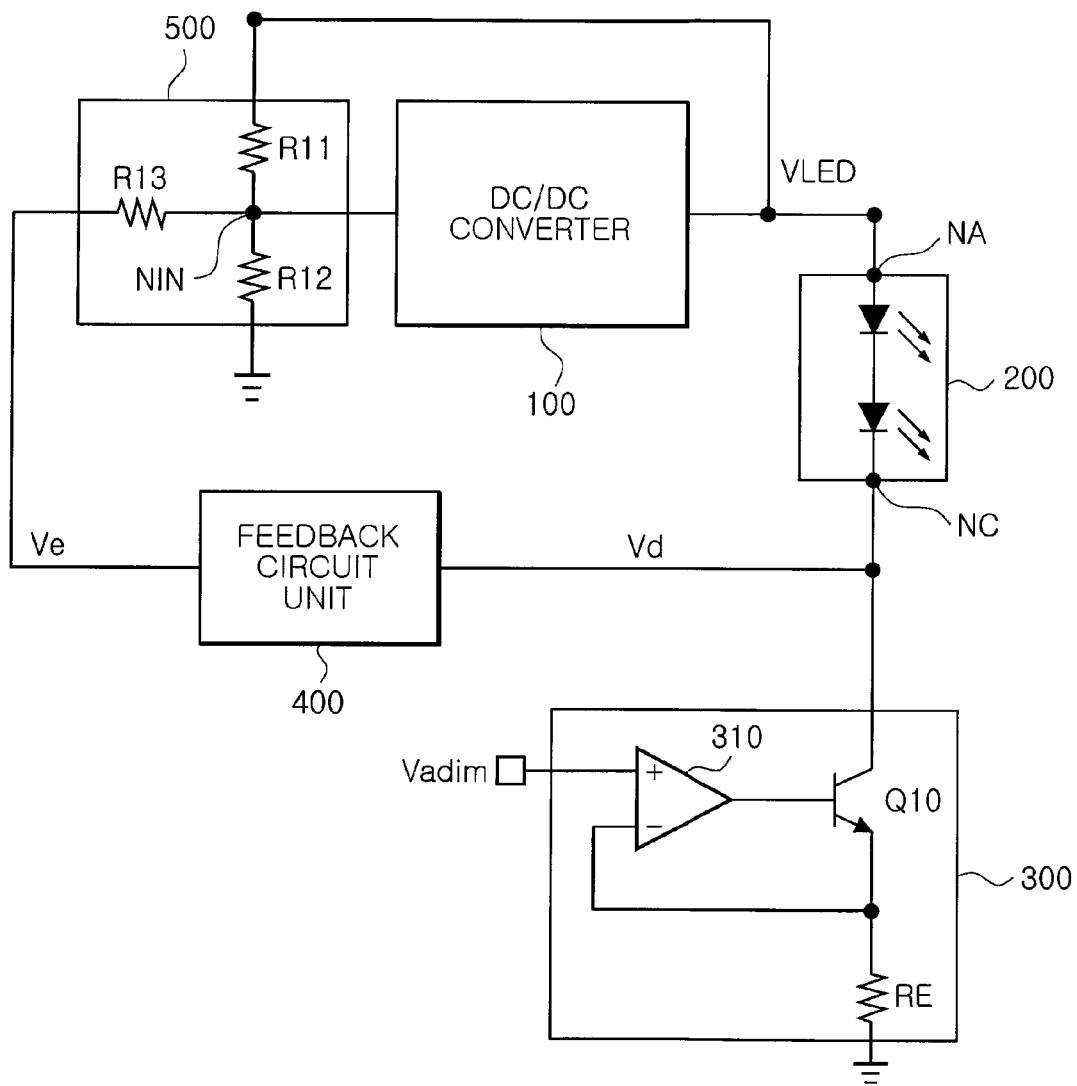
FIG. 1 is a block diagram illustrating a configuration of an apparatus for driving a light emitting device according to an exemplary embodiment of the present invention.

Exemplary embodiments of the present invention will now be described in detail with reference to the accompanying drawings. The invention may however be embodied in many different forms and should not be construed as limited to the embodiments set forth herein. The same reference numerals will be used throughout to designate the same or like components.

FIG. 1 is a block diagram illustrating a configuration of an apparatus for driving a light emitting device according to an exemplary embodiment of the invention. Referring to FIG. 1, an apparatus for driving a light emitting device according to this embodiment includes a DC/DC converter unit 100, a current source 300, a feedback circuit unit 400 and a feedback coupling circuit unit 500. The DC/DC converter unit 100 generates driving power on the basis of an input voltage and supplies the generated driving power to an anode NA of a light emitting unit 200 that includes a plurality of light emitting devices. The current source 300 controls current levels to keep the current flowing through the light emitting unit 200 constant. The feedback circuit unit 400 detects voltage at a cathode NC of the light emitting unit 200. The feedback coupling circuit unit 500 couples the output of the feedback circuit unit 400 and the input of the DC/DC converter unit 100 to supply the input voltage of the DC/DC converter unit 100, according to the voltage detected by the feedback circuit unit 400 and an output voltage VLED of the DC/DC converter unit 100.

Here, the light emitting unit 200 may include light emitting diodes (LEDs) as the plurality of light emitting diodes. For example, the light emitting unit 200 may include a plurality of LEDs that are connected in series with each other.

The feedback coupling circuit unit 500 may include a first resistor R11, a second resistor R12 and a third resistor R13. The first resistor R11 is connected between an output terminal of the DC/DC converter unit 100 and an input node NIN of the DC/DC converter unit 100. The second resistor R12 is connected between the input node NIN and a ground. The third resistor R13 is connected between an output terminal of the feedback circuit unit 400 and the input node NIN.

The current source 300 includes a first transistor Q10 and a first comparator 310. The first transistor Q10 includes a collector that is connected to the cathode NC of the light emitting unit 200, an emitter connected to a ground through an emitter resistor RE and a base. The first comparator 310 includes an inverting input terminal that is connected to the emitter of the first transistor Q10, a non-inverting input terminal that receives an analog dimming voltage Vadim, and an output terminal that is connected to the base of the first transistor Q10. The first comparator 310 compares the analog dimming voltage Vadim and a voltage applied to the emitter resistor RE, and a voltage according to the comparison result to the base of the first transistor Q10.

Figure 2:
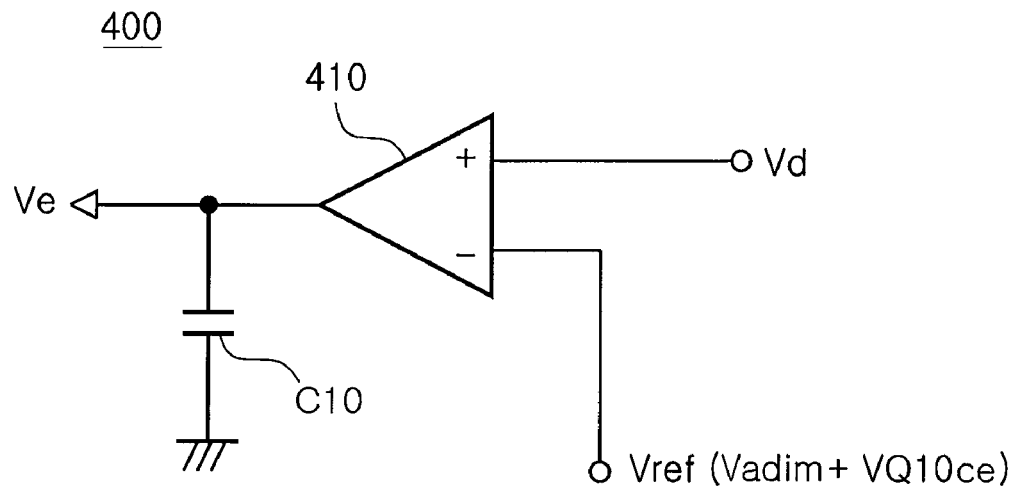
FIG. 2 is an internal circuit diagram illustrating a feedback circuit unit according to an exemplary embodiment of the present invention.

FIG. 2 is an internal circuit diagram illustrating a feedback circuit unit according to an exemplary embodiment of the invention. Referring to FIG. 2, the feedback circuit unit 400 includes a V/I amplifier 410 and a capacitor C10. The V/I amplifier 410 outputs an error current Ie corresponding to a difference voltage between a detection voltage Vd from the cathode NC of the light emitting unit 200 and a predetermined reference voltage Vref. The capacitor C10 stores charges according to the error current Ie that is output from the V/I amplifier 410 to supply an error voltage Ve to the feedback coupling circuit unit 500.

Here, the reference voltage Vref corresponds to a voltage obtained by adding the analog dimming voltage Vadim and a collector-emitter voltage VQ10ce of the first transistor Q10.

Figure 3:
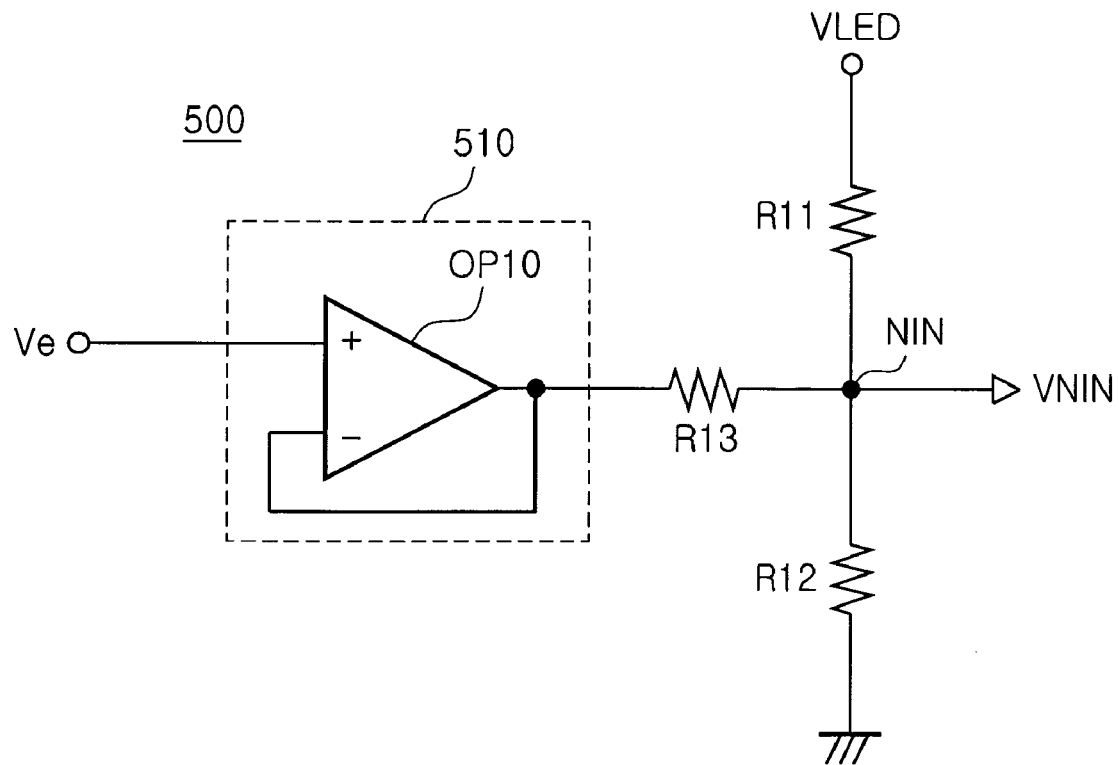
FIG. 3 is a view illustrating a first example of a feedback coupling circuit unit 500 according to an exemplary embodiment of the present invention.
Figure 4:
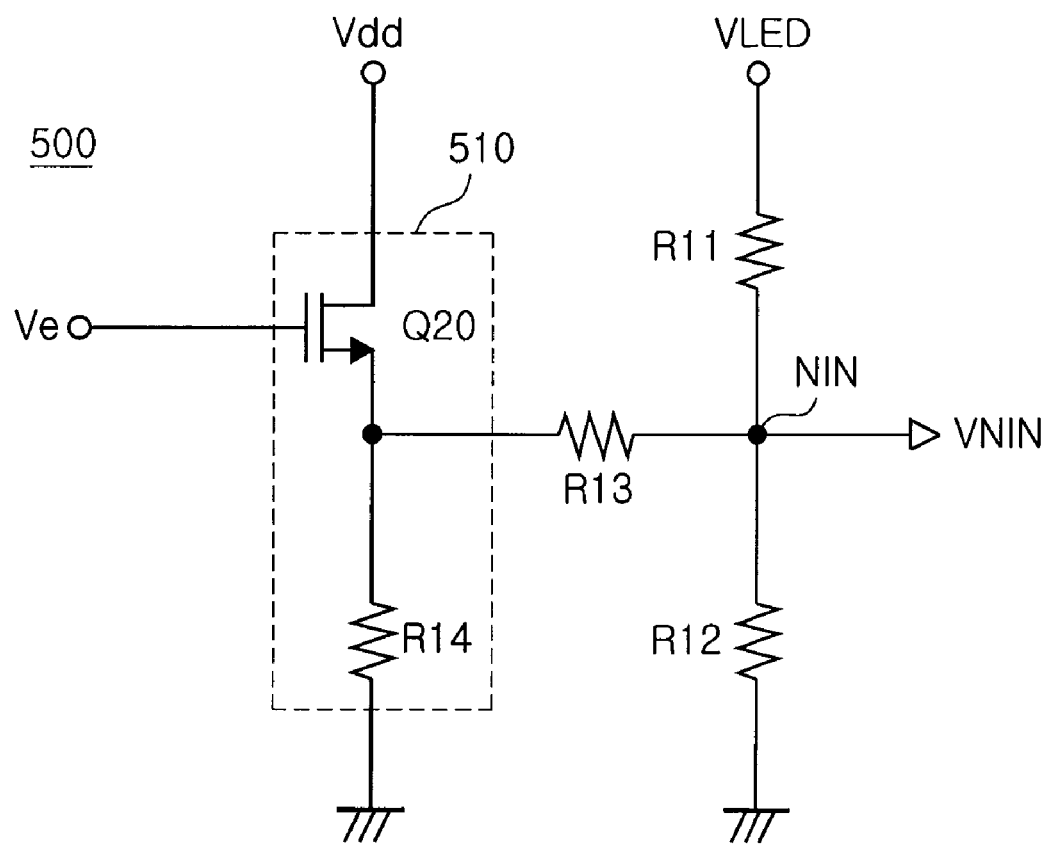
FIG. 4 is a view illustrating a second example of a feedback coupling circuit unit 500 according to an exemplary embodiment of the present invention.

FIG. 3 is a view illustrating a first example of the feedback coupling circuit unit 500 according to an exemplary embodiment of the invention. FIG. 4 is a view illustrating a second example of the feedback coupling circuit unit 500 according to an exemplary embodiment of the invention.

Referring to FIGS. 3 and 4, the feedback coupling circuit unit 500 includes a buffer amplifier 510, a first resistor R11, a second resistor R12 and a third resistor R13. The buffer amplifier 500 buffers the error voltage Ve supplied from the feedback circuit unit 400. The first resistor R11 is connected between the output terminal of the DC/DC converter unit 100 and the input node NIN of the DC/DC converter unit 100. The second resistor R12 is connected between the input node NIN and the ground. The third resistor R13 is connected between an output terminal of the buffer amplifier 510 and the input node NIN.

Referring to FIG. 3, the buffer amplifier 510 may include a first operational amplifier OP10 that includes a non-inverting input terminal, an inverting input terminal and an output terminal. Here, the non-inverting input terminal of the buffer amplifier 510 may be connected to the output terminal of the feedback circuit unit 400, and the inverting input terminal of the buffer amplifier 510 may be connected to the output terminal of the buffer amplifier 510.

Referring to FIG. 4, the buffer amplifier 510 may include a second transistor Q20 that includes a collector, an emitter and a base. The collector of the second transistor Q20 may be connected to an operating power supply Vdd terminal, the emitter of the second transistor Q20 may be connected to the ground through the fourth resistor R14, and the base of the second transistor Q20 may be connected to the output terminal of the feedback circuit unit 400.

Hereinafter, the operation and effect of the invention will be described in detail with reference to the accompanying drawings.

The apparatus for driving a light emitting device according to the exemplary embodiment of the invention will be described with reference to FIGS. 1 through 4. In FIG. 1, the apparatus for driving a light emitting device according to this embodiment includes the DC/DC converter unit 100, the current source 300, the feedback circuit unit 400 and the feedback coupling circuit unit 500 to efficiently drive light emitting devices.

The DC/DC converter unit 100 generates driving power on the basis of the input voltage and supplies the generated driving power to the anode NA of the light emitting unit 200 that includes a plurality of light emitting devices.

The current source 300 controls so that the current, flowing through the light emitting unit 200, becomes a predetermined constant current for the safe driving of the light emitting unit 200.

The feedback circuit unit 400 detects voltage at the cathode NC of the light emitting unit 200 and supplies the detected voltage to the feedback coupling circuit unit 500.

The feedback coupling circuit unit 500 couples the output of the feedback circuit unit 400 and the input of the DC/DC converter unit 100 and supplies the input voltage of the DC/DC converter unit 100 according to the voltage detected by the feedback circuit unit 400 and the output voltage VLED of the DC/DC converter unit 100.

Here, the light emitting unit 200 may include LEDs as the plurality of light emitting devices. For example, the light emitting unit 200 may include an LED array in which a plurality of LEDs are connected in series with each other or a plurality of LED arrays in which LED arrays are connected in parallel to each other.

Specifically, the feedback coupling circuit unit 500 will be described with reference to FIG. 1. When the feedback coupling circuit unit 500 includes the first resistor R11, the second resistor R12 and the third resistor R13, the output voltage VLED of the DC/DC converter unit 100 is divided by the first resistor R11 and the second resistor R12 and supplied to the DC/DC converter unit 100, the divided voltage appearing at the input node NIN corresponding to an intermediate node between the first resistor R11 and the second resistor R12.

Here, it is determined such that the error voltage Ve of the feedback circuit unit 400 and the voltage at the input node NIN are the same voltage in the normal state.

Therefore, in the normal state, the voltage divided by the first resistor R11 and the second resistor is supplied to the DC/DC converter unit 100.

In order to keep the current flowing through the light emitting unit 200 constant, when the current source 300 includes the first transistor Q10 and the first comparator 310, the first transistor Q10 performs its operation according to an output voltage of the first comparator 310 to control the current flowing through the light emitting unit 200.

Here, the first comparator 310 compares the predetermined analog dimming voltage Vadim and the voltage across the emitter resistor RE, supplies a difference in voltage according to the comparison to the base of the first transistor Q10, so that the current flowing through the first transistor Q10 can be controlled to thereby control the current flowing through the light emitting unit 200.

Referring to FIG. 2, in order to detect whether the plurality of LEDs of the light emitting unit 200 are open, when the feedback circuit unit 400 includes the V/I amplifier 410 and the capacitor C10, the V/I amplifier 410 outputs the error current Ie corresponding to a difference voltage determined by the difference between the detection voltage Vd at the cathode NC of the light emitting unit 200 and the predetermined reference voltage Vref.

Here, charges according to the error current Ie from the V/I amplifier 410 are stored in the capacitor C10 so that the error voltage Ve may be supplied to the feedback coupling circuit unit 500.

Here, the reference voltage Vref is used to determine whether the voltage applied between the light emitting unit 200 and the ground is a normal voltage or not. The reference voltage Vref is determined by adding the analog dimming voltage Vadim and the collector-emitter voltage VQ10ce of the first transistor Q10.

In this way, the feedback circuit unit 400 can normally detect the current flowing through the light emitting unit 200.

Examples of the feedback coupling circuit unit 500 will be described in detail with reference to FIGS. 3 and 4.

First, when the light emitting unit 200 performs a normal operation, if the DC/DC converter unit 100 has an input voltage of 2.5V, the feedback circuit unit 400 has an error voltage Ve of 2.5V, and the first resistor R11 and the second resistor R12 have the same value, the output voltage VLED is divided by the first resistor R11 and the second resistor R12, and a voltage of 2.5V is applied to the input node NIN of the DC/DC converter unit 100. The error voltage Ve of 2.5V from the feedback circuit unit 400 is output through the buffer amplifier 510. Here, the feedback coupling circuit unit 500 operates so that the error voltage Ve (2.5V) output from the buffer amplifier 510 and the voltage of 2.5V applied to the input node NIN are the same as each other. As a result, the DC/DC converter unit 100 outputs the output voltage VLED of 5V.

On the other hand, as shown in FIGS. 1 and 4, when the light emitting unit 200 performs an abnormal operation, that is, when LEDs are open, if the DC/DC converter unit 100 has the input voltage of 2.5V and the first resistor R11, the second resistor R12 and the third resistor R13 have the same value, the output voltage VLED is divided by the first resistor R11 and the second resistor R12, and the a voltage of 2.5V is applied to the input node NIN of the DC/DC converter unit 100.

Meanwhile, since the error voltage Ve from the feedback circuit unit 400 becomes zero voltage, the feedback coupling circuit unit 500 operates so that a voltage of 2.5 is applied across the input node NIN by the parallel resistance (R12//R13) including the second resistor R12 and the third resistor R13, and the first resistor R11. As a result, the DC/DC converter unit 100 has the output voltage VLED of approximately 7.5V.

As described above, even when the LEDs of the light emitting unit 200 are open, the voltage across the parallel resistors (R12//R13) including the second resistor R12 and the third resistor R13 is applied to the DC/DC converter unit 100. Since the output voltage VLED of the DC/DC converter unit 100 can increase to the maximum voltage, the DC/DC converter unit 100 and the light emitting unit 200 can be protected.

In the apparatus for driving a light emitting device according to this embodiment, the DC/DC converter may be an isolated DC/DC converter using a transformer or a non-isolated DC/DC converter using an error amplifier and a photo-coupler.

As set forth above, according to exemplary embodiments of the invention, as a feedback circuit and a DC/DC converter can be simply coupled to each other, DC/DC conversion can be optimized, and the driving efficiency of the DC/DC converter can be increased.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for driving a light emitting unit, the apparatus comprising:
   a DC/DC converter unit configured to generate driving power based on an input voltage and supply the generated driving power to an anode of the light emitting unit including a plurality of light emitting devices;

a current source configured to control a current level of a current flowing through the light emitting unit to keep the current constant;

a feedback circuit unit configured to detect a voltage at a cathode of the light emitting unit; and a feedback coupling circuit unit coupling an output terminal of the feedback circuit unit and an input node of the DC/DC converter unit to supply the input voltage to the DC/DC converter unit according to the voltage detected by the feedback circuit unit and an output voltage of the DC/DC converter unit, wherein the light emitting devices are light emitting diodes, and the feedback coupling circuit unit comprises:

a first resistor connected between an output node of the DC/DC converter unit and the input node of the DC/DC converter unit;
   a second resistor connected between the input node and a ground; and
   a third resistor connected between the output terminal of the feedback circuit unit and the input node.

2. The apparatus of claim 1, wherein the current source comprises:

a first transistor having a collector connected to the cathode of the light emitting unit, an emitter connected to the ground through an emitter resistor, and a base; and a first comparator having a non-inverting input terminal connected to the emitter of the first transistor, an inverting input terminal for receiving an analog dimming voltage, and an output terminal connected to the base of the first transistor, the first comparator configured to compare the analog dimming voltage and a voltage across the emitter resistor and to supply a difference voltage between the analog dimming voltage and the voltage across the emitter resistor to the base of the first transistor.

3. The apparatus of claim 2, wherein the feedback circuit unit comprises:

a V/I amplifier configured to output an error current corresponding to a difference voltage between the voltage detected at the cathode of the light emitting unit and a predetermined reference voltage; and a capacitor configured to store charges according to the error current from the V/I amplifier to supply an error voltage to the feedback coupling circuit unit.

4. The apparatus of claim 3, wherein the reference voltage is a sum of the analog dimming voltage and a voltage between the collector and the emitter of the first transistor.

5. An apparatus for driving a light emitting unit, the apparatus comprising:

a DC/DC converter unit configured to generate driving power based on an input voltage and supply the generated driving power to an anode of the light emitting unit including a plurality of light emitting devices;

a current source configured to control a current level of a current flowing through the light emitting unit to keep the current constant;

a feedback circuit unit configured to detect a voltage at a cathode of the light emitting unit; and a feedback coupling circuit unit coupling an output terminal of the feedback circuit unit and an input node of the DC/DC converter unit to supply the input voltage to the DC/DC converter unit according to the voltage detected by the feedback circuit unit and an output voltage of the DC/DC converter unit, wherein the light emitting devices are light emitting diodes, and the feedback coupling circuit unit comprises:

a buffer amplifier configured to buffer an error voltage from the feedback circuit unit;
   a first resistor connected between an output node of the DC/DC converter unit and the input node of the DC/DC converter unit;
   a second resistor connected between the input node and a ground; and
   a third resistor connected between an output terminal of the buffer amplifier and the input node.

6. The apparatus of claim 5, wherein the current source comprises:

a first transistor having a collector connected to the cathode of the light emitting unit, an emitter connected to the ground through an emitter resistor, and a base; and a first comparator having an inverting input terminal connected to the emitter of the first transistor, a non-inverting input terminal for receiving an analog dimming voltage, and an output terminal connected to the base of the first transistor, the first comparator configured to compare the analog dimming voltage and a voltage across the emitter resistor and to supply a difference voltage between the analog dimming voltage and the voltage across the emitter resistor to the base of the first transistor.

7. The apparatus of claim 6, wherein the feedback circuit unit comprises:

a V/I amplifier configured to output an error current corresponding to a difference voltage between the voltage detected at the cathode of the light emitting unit and a predetermined reference voltage; and a capacitor configured to store charges according to the error current from the V/I amplifier and supplying the error voltage to the feedback coupling circuit unit.

8. The apparatus of claim 7, wherein the reference voltage is a sum of the analog dimming voltage and a voltage between the collector and the emitter of the first transistor.

9. The apparatus of claim 8, wherein the buffer amplifier comprises a first operational amplifier having a non-inverting input terminal, an inverting input terminal, and the output terminal, and the non-inverting input terminal of the first operational amplifier is connected to the output terminal of the feedback circuit unit, and the inverting input terminal of the first operational amplifier is connected to the output terminal of the first operational amplifier.

10. The apparatus of claim 8, wherein the buffer amplifier comprises a second transistor having a collector, an emitter, and a base, and the collector of the second transistor is connected to an operating power supply terminal, the emitter of the second transistor is connected to the ground through a fourth resistor, and the base of the second transistor is connected to the output terminal of the feedback circuit unit.

* * * * *